US012602592B2

(12) United States Patent
Hu

(10) Patent No.: US 12,602,592 B2
(45) Date of Patent: Apr. 14, 2026

(54) NOISE COMMUNICATION FOR FEDERATED LEARNING

(71) Applicant: Aivitae LLC, Redwood City, CA (US)

(72) Inventor: Bob Sueh-chien Hu, Los Altos, CA (US)

(73) Assignee: Aivitae LLC, Redwood City, CA (US)

( * ) Notice: Subject to any disclaimer, the term of this patent is extended or adjusted under 35 U.S.C. 154(b) by 895 days.

(21) Appl. No.: 17/929,541

(22) Filed: Sep. 2, 2022

(65) Prior Publication Data

US 2024/0078438 A1     Mar. 7, 2024

(51) Int. Cl.
*G06N 3/098*     (2023.01)
*G06N 3/09*     (2023.01)

(52) U.S. Cl.
CPC .................................... *G06N 3/098* (2023.01)

(58) Field of Classification Search
CPC ............. G06N 3/098; G06N 3/09; G06N 3/08
See application file for complete search history.

(56) References Cited

U.S. PATENT DOCUMENTS

| | | | | |
|---|---|---|---|---|
| 10,430,708 | B1 * | 10/2019 | Hu ............................ | G06T 5/70 |
| 2023/0214642 | A1 * | 7/2023 | Sidahmed .............. | G06N 3/084 |
| | | | | 706/25 |

OTHER PUBLICATIONS

Ang et al., Robust Federated Learning with Noisy Communication, Nov. 1, 2019, https://arxiv.org/abs/1911.00251 (Year: 2019).*
Goetz et al., Federated Learning via Synthetic Data, Sep. 26, 2020, https://arxiv.org/abs/2008.04489 (Year: 2020).*

* cited by examiner

*Primary Examiner* — Kakali Chaki
*Assistant Examiner* — Molly C Sippel
(74) *Attorney, Agent, or Firm* — Foley & Lardner LLP

(57)     ABSTRACT
In some embodiments, a method includes sending, from a first set of computing devices, a distributed instance of a machine learning model to a client computing device, where the client computing device is caused to provide a set of outputs related to the noise data, and where the set of outputs is an output of the distributed instance derived from inputting the noise data into the distributed instance. The method further includes receiving the set of outputs from the client computing device and configuring another instance of the machine learning model based on the noise data and the set of outputs related to the noise data.

20 Claims, 4 Drawing Sheets

300

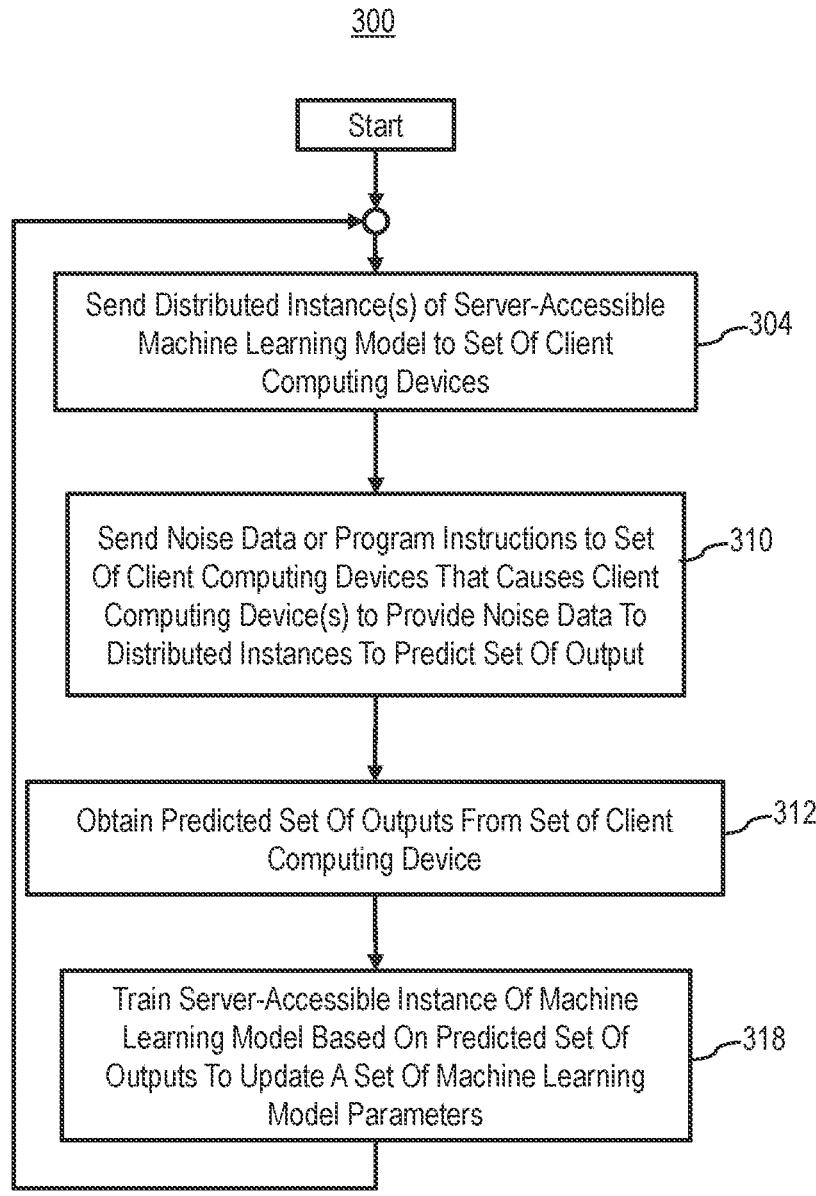

Start

Send Distributed Instance(s) of Server-Accessible Machine Learning Model to Set Of Client Computing Devices —304

Send Noise Data or Program Instructions to Set Of Client Computing Devices That Causes Client Computing Device(s) to Provide Noise Data To Distributed Instances To Predict Set Of Output —310

Obtain Predicted Set Of Outputs From Set of Client Computing Device —312

Train Server-Accessible Instance Of Machine Learning Model Based On Predicted Set Of Outputs To Update A Set Of Machine Learning Model Parameters —318

NOISE COMMUNICATION FOR FEDERATED LEARNING

SUMMARY

Federated learning provides significant opportunities to combine the computing power and private data of various devices to improve a distributed machine learning model's ability to form predictions based on data provided by the various devices. By taking advantage of device-specific data, such as sensor-specific information, federated learning processes may generate robust models adaptable to generating predictions based on image data or other types of data collected by various imaging systems or other types of sensor systems. Such operations permit device-specific models to become far more robust by expanding the available training data beyond a small subset of known devices that may focus on data from out-of-date devices or data that does not include real-world biases. However, in many cases, a federated learning model's outputs may be insufficiently accurate to satisfy requirements for real-world prediction operations.

Some embodiments may address these complexities by causing a set of client computing devices to send client-generated machine learning model outputs to a server that then uses the set of outputs to update a machine learning model. In some embodiments, the server may send a distributed instance of a machine learning model to a client computing device. The client computing device may obtain a labeled set of images from a locally available memory for noise image generation and use the labeled set of images to train the distributed instance. The client computing device may then obtain noise data, such as noise images (e.g., receiving the noise data from the server, generating the noise data at the computing device, etc.). The client computing device may then provide the noise data to the updated machine learning model to generate a set of outputs and transmit the set of outputs to the server. Furthermore, the client computing device may transmit client-generated noise data to the server.

Some embodiments may then receive the set of outputs and an associated set of noise data. Alternatively, some embodiments may obtain previously-sent noise data associated with the set of outputs. Some embodiments may then use the client-generated noise images and associated labels or other outputs to train an instance of the machine learning model stored on the server or otherwise accessible to the server. For example, some embodiments may receive a set of 600 client-generated noise images and a set of labels associated with the client-generated noise images such that each respective noise image is associated with a respective label. Some embodiments may then train a server-accessible instance of the machine learning model to identify labels based on the client-generated noise images. For example, some embodiments may use noise images to train a convolutional neural network by using the noise images as input data and determining objective function values based on known labels associated with the noise images.

Various other aspects, features, and advantages of the invention will be apparent through the detailed description of the invention and the drawings attached hereto. It is also to be understood that both the foregoing general description and the following detailed description are examples, and not restrictive of the scope of the invention.

BRIEF DESCRIPTION OF THE DRAWINGS

FIG. 3 shows a flowchart for distributing a learning model and training a federated machine learning model based on training results provided by client computing devices, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
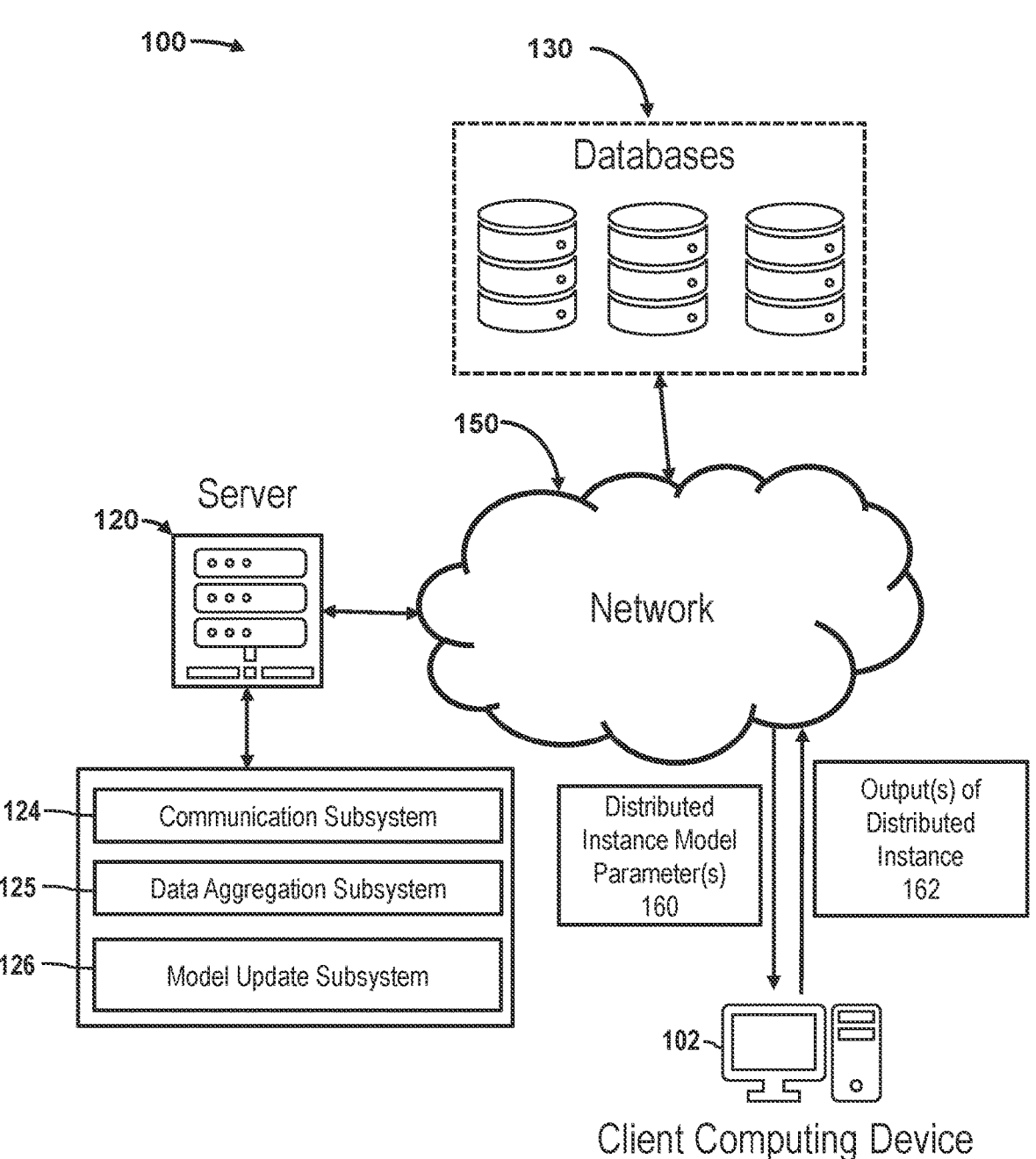
FIG. 1 shows an example computing system to train a federated machine learning model based on noise data generated from client computing devices, in accordance with one or more embodiments.

FIG. 1 shows an example computing system to train a federated machine learning model based on noise data generated from client computing devices, in accordance with one or more embodiments. A system 100 includes a client computing device 102. While shown as a desktop computer, the client computing device 102 may include other types of computing devices, such as a laptop computer, a mobile computing device, a wearable headset, a smartwatch, etc. In some embodiments, the client computing device 102 may communicate with various other computing devices via a network 150, where the network 150 may include the Internet, a local area network, a peer-to-peer network, etc.

The client computing device 102 or other computing devices may send and receive messages through the network 150 to communicate with a server 120, where the server 120 may include a non-transitory storage medium storing program instructions to perform one or more operations of subsystems 124-126. Further, while one or more operations are described herein as being performed by particular components of the system 100, those operations may be performed by other components of the system 100 in some embodiments. One or more operations described in this disclosure as being performed by the server 120 may instead be performed by the client computing device 102 or other computing devices described in this disclosure. For example, the client computing device 102 may perform operations to train a distributed instance of a machine learning model based on noise data provided by other client computing devices.

In some embodiments, a memory of the client computing device 102 or another computing device may be used to store program instructions for applications, parameters associated with the machine learning models, or other data described in this disclosure. In addition, although some embodiments are described herein with respect to neural network models, other machine learning models may be used instead of or in addition to the neural network models. For example, the server 120 may send to the client computing device 102 a set of parameters representing a distributed instance of a gradient boosting tree model, such as a model implemented with the XGBoost library. The client computing device 102 may then perform a set of training operations that causes the client computing device to update the distributed instance after generating noise data using operations described in this disclosure. After the training operation, the client computing device 102 may then receive, generate, or obtain noise data and provide the noise data to the updated distributed instance to predict a set of outputs. The client computing device may then send the predicted set of outputs to the server 120, which may then update a server-accessible machine learning model based on the predicted set of outputs.

In some embodiments, the set of computing systems and subsystems illustrated in FIG. 1 may include one or more computing devices having electronic storage or otherwise capable of accessing electronic storage, where the electronic storage may include the set of databases 130. The set of databases 130 may include various values used to perform operations described in this disclosure, such as test data, noise data, aggregated machine learning model parameters, individual machine learning model parameters received from different computer devices, hyperparameters for machine learning models, other values used in this disclosure, etc.

In some embodiments, a communication subsystem 124 may send a distributed instance of a machine learning model to the client computing device 102 or other client computing devices. The communication subsystem 124 may retrieve the learning model from the set of databases 130 or another memory accessible to the server 120. For example, the server 120 may access a set of neural network weights of a neural network and send the set of neural network weights to one or more client computing devices, such as the client computing device 102.

In some embodiments, sending an instance of a machine learning model may include sending values representing the weights, biases, activation function parameter values, hyperparameters, or other values characterizing a set of elements of the machine learning model. For example, the communication subsystem 124 may send a machine learning model to the client computing device 102 by sending each of the neural network weights and filter values of a convolutional neural network to the client computing device 102. Various types of neural networks may be sent, such as a recurrent neural network, a convolutional neural network, etc. Furthermore, while some embodiments may send a neural network, other embodiments may send other types of machine learning models. For example, some embodiments may send values for a gradient-boosted tree, a random forest model, a Naïve Bayes model, etc.

In some embodiments, the communication subsystem 124 may send other data to the client computing device 102, such as noise data or a set of data generation parameters used by the client computing device 102 to generate noise data or other types of data. For example, some embodiments may send to the client computing device 102 a range represented by a first distribution parameter "0" and a second distribution parameter "10." The client computing device may then generate a set of noise images by randomly selecting pixel values within the range. Furthermore, as described elsewhere in this disclosure, some embodiments may compare an expected parameter value sent to the client computing device 102 and a noise distribution value or another type of data generation value to determine whether the training data generated by the client computing device 102 is anomalous.

In some implementations, the client computing device 102 may update its distributed instance of a machine learning model stored on a client memory ("client model instance") by performing a training operation based on the inputs received by the client computing device 102. For example, the client computing device 102 may obtain a set of training images from the server 120 that includes a set of images labeled by a user and then train a distributed instance based on the training images to update its client model instance. Alternatively, or additionally, the client computing device 102 may update its client model instance based on data stored or otherwise accessible to the client computing device 102. For example, the client computing device 102 may update a client model instance of a neural network based on user-labeled images.

In some embodiments, the client computing device 102 may generate a set of noise data to predict outputs of an updated client model instance. For example, the client computing device 102 may determine a set of noise distribution parameters based on an initial set of images. The client computing device 102 may then generate a set of noise images based on the set of noise distribution parameters, such as by changing the color or brightness values characterizing a pixel by a number determined from a range defined by the set of noise distribution parameters.

In some embodiments, the client computing device 102 may then provide noise data to a trained distributed instance of a machine learning model to determine a set of outputs of the trained distributed instance. The set of outputs 162 may include labels, image positions, image boundaries, values representing a reconstructed portion of an image, etc. (e.g., the set of outputs 162). After determining the set of outputs 162, the client computing device 102 may send the set of outputs 162 to the server 120 via the network 150. Some embodiments may then use the set of outputs 162 during a training operation to update a machine learning model that will then be re-distributed to other client computing devices.

Furthermore, the client computing device 102 may perform operations to determine whether a set of weights for a machine learning model differ from the initial set of parameters sent to them from the server 120. Based on a determination that a difference between the distributed instance model parameters 160 and a trained set of model parameters is less than a difference threshold, the client computing device 102 may send the set of outputs 162 and noise data associated with the set of outputs 162 to the server 120 via the network 150. Alternatively, the client computing device 102 may send the set of outputs 162 without sending noise data. Furthermore, based on a determination that a difference between the distributed instance model parameters 160 and a trained set of model parameters is greater than a difference threshold, some embodiments may send model parameters instead of or in addition to sending the set of outputs of a distributed instance.

In some embodiments, a data aggregation subsystem 125 may collect the labels, confidence intervals, image positions, image regions, or other outputs of a machine learning model. The data aggregation subsystem 125 may also collect noise images, other noise data, or other data sent from the client computing device 102 or other computing devices connected to the network 150. The data aggregation subsystem 125 may obtain noise images in the form of text, compressed images, other types of compressed data, other types of encrypted or encoded information, etc. For example, data aggregation subsystem 125 may collect, from the client computing device 102, training outputs indicating a set of labels associated with the noise images or other information associated with the noise images. In some embodiments, the training output may include multiple types of outputs. For example, the data aggregation subsystem 125 may obtain a label "carcinoma" and a set of coordinates representing a region of a noise image associated with the label. Furthermore, the data aggregation subsystem 125 may obtain a noise image from the client computing device 102 associated with one or more outputs.

In some embodiments, the data aggregation subsystem 125 may reduce the amount of data received from client computing devices to a reduced amount of data. For example, the data aggregation subsystem 125 may reduce the noise images provided by the client computing device 102 from a first number of noise images to a reduced number of noise images. Some embodiments may implement specific image selection criteria when determining which images from a set of images to use for training. For example, the data aggregation subsystem 125 may determine initial metrics for each image based on a maximum pixel brightness, minimum pixel brightness, average pixel brightness, etc. and select a noise image for inclusion in a representative subset used to train a server-accessible machine learning model.

After obtaining data used to train a machine learning model from the client computing device 102, some embodiments may combine the data or otherwise processed the data using the data aggregation subsystem 125. Combining data may include determining a measure of central tendency, such as a mean or a median. After using the data aggregation subsystem 125 to perform the set of processing operations, some embodiments may use the processed output to perform a training operation, as described elsewhere in this disclosure.

In some embodiments, the model update subsystem 126 may update a machine learning model based on the set of outputs 162, other data provided by the client computing device 102, data provided by other client computing devices, data obtained from other data sources, etc. For example, after reducing the amount of training data obtained from a set of client computing devices into a representative set of noise data, some embodiments use the model update subsystem 126 to train a server-accessible machine learning model based on the set of outputs 162 and an associated set of noise images.

In some embodiments, the model update subsystem 126 may first directly update a set of machine learning parameters based on an updated set of machine learning parameters provided by a set of client computing devices that includes the client computing device 102. For example, some embodiments may combine parameter data obtained from computing devices that represent a new parameter value, such as weight, bias, another type of neural network parameter, another type of machine learning model parameter, etc. Some embodiments may then substitute a previous parameter value with the new parameter value. Alternatively, a parameter value may represent a change to an existing value, such as a change to an existing neural network weight. In response to receiving a change to the stored parameter value, some embodiments may update the stored parameter value with the change indicated by the combined parameter value. After directly updating a set of server-side machine learning parameters based on machine learning parameters sent from client computing devices, some embodiments may then perform a set of training operations to further update the set of server-accessible machine learning parameters.

Figure 2:
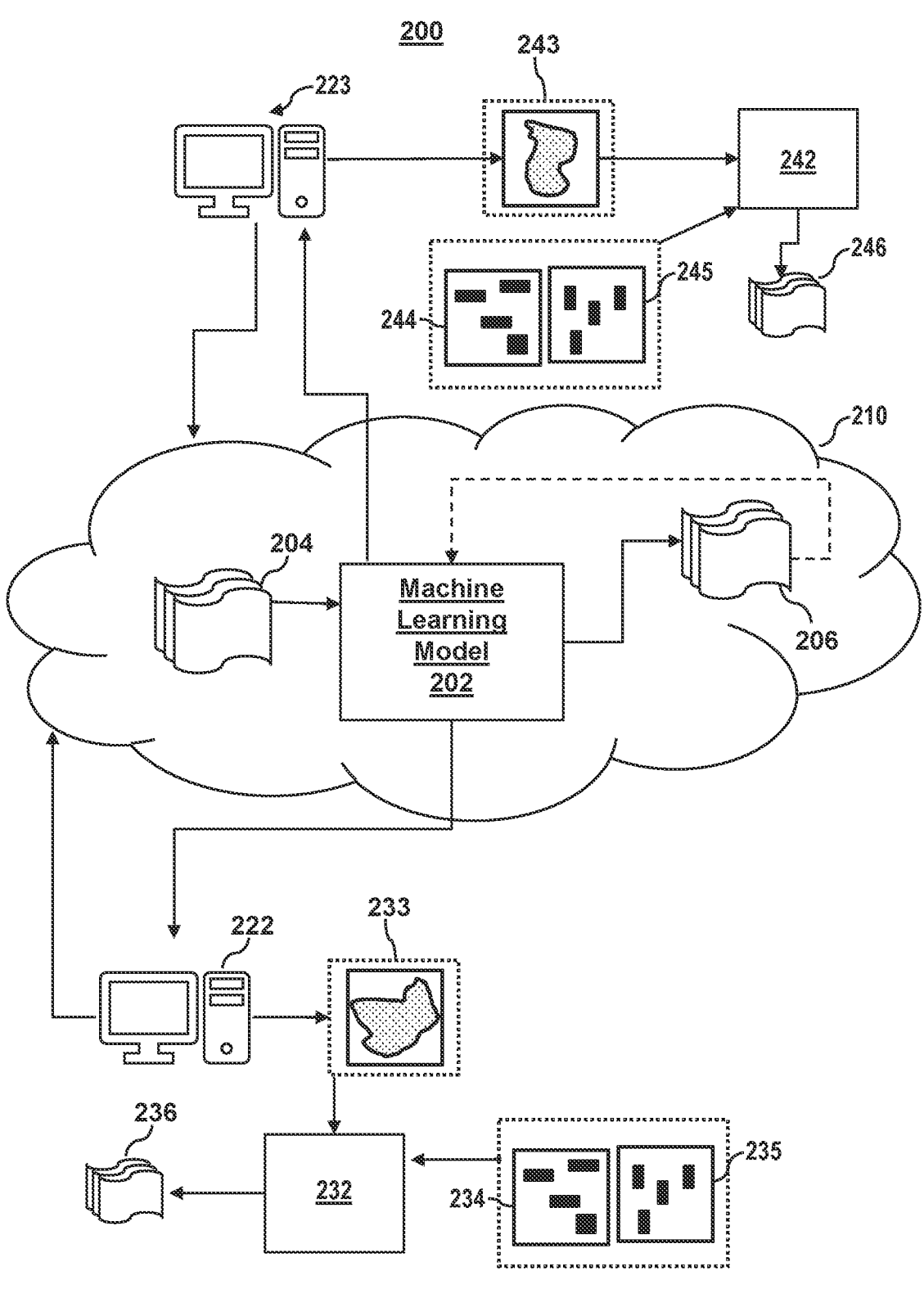
FIG. 2 shows a conceptual diagram for training a federated machine learning model, in accordance with one or more embodiments.

FIG. 2 shows a conceptual diagram for training a federated machine learning model, in accordance with one or more embodiments. A system 200 may include a plurality of computing devices that includes a first computing device 222 and a second computing device 223. Though depicted as desktop computing devices, each of the computing devices 222-223 may be any computing device, including, but not limited to, a smartphone, a laptop computer, a computer integrated into a magnetic resonance imaging (MRI) machine, etc. The system 200 also includes cloud system 210 implemented on a computing system, where the cloud system 210 may include any computing device described in this disclosure or any other type of computing device. For example, the computing system may be a distributed computing system that includes a set of computing nodes. The cloud system 210 may include a set of programs or computing services being executed by a distributed computing system or another type of computing system. In some embodiments, the cloud system 210 may perform processing operations or data storage operations similar to or the same as operations described elsewhere in this disclosure. For example, the cloud system 210 may perform a set of operations performed by the client computing device 102, a second client computing device, the server 120, the network 150, or the set of databases 130.

In some embodiments, the cloud system 210 may include a machine learning model 202. The machine learning model 202 may receive a set of inputs 204 and provide a set of outputs 206. The inputs may include training datasets, testing datasets, validation datasets, or other types of datasets. The machine learning model 202 may include a deep-layer neural network having multiple layers, a set of gradient-boosted trees, etc. In such embodiments, machine learning model 202 may include an input layer and a set of hidden layers. Each neural unit of the machine learning model 202 may be connected with many other neural units of the machine learning model 202. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units.

In some embodiments, the machine learning model 202 may update its configurations (e.g., weights, biases, or other parameters) based on the set of outputs 206 and reference feedback information (e.g., user indication of accuracy, reference vectors, or other information). Connection weights of the machine learning model 202 may be adjusted to reconcile differences between the neural network's prediction and reference feedback, where these differences may be determined in the form of objective function values. Furthermore, some embodiments may use different types of machine learning models to obtain different types of results. Furthermore, some embodiments may use a machine learning model that includes different sub-models capable of being used in series, where outputs of one sub-model may be used as inputs of another sub-model. Some embodiments may use a machine learning model to label a region of an image. For example, some embodiments may use the machine learning model 202 to generate the set of outputs 206 based on the set of inputs 204, where the outputs 206 may indicate a region of an image (e.g., a set of values representing pixel coordinates) and a label "tumor" associated with the region of the image. The set of inputs may include sensor information (e.g., a set of measurements provided by spectroscopy, a blood analysis, a height, weight, etc.), labeled data provided by client computing devices, noise images, etc. In some embodiments, the machine learning model 202 may include a neural network such as a convolutional neural network, an encoder-decoder neural network, a transformer neural network, a long-short-term-memory (LSTM) neural network, an ensemble neural network, or another type of neural network. In some embodiments, outputs 206 may be fed back to the machine learning model 202 as inputs to train the machine learning model 202. For example, the outputs 206 may be used to label input data. An indication that an output does not match a training objective associated with the input data during a training operation may cause some embodiments to retrain the machine learning model 202 and update the associated learning model parameters of the machine learning model 202.

In some embodiments, the cloud system 210 may distribute the machine learning model 202 to the computing devices 222-223. The first computing device 222 may receive the first distributed instance 232. Similarly, the second computing device 223 may receive the second distributed instance 242. In some embodiments, different computing devices may receive different machine learning model parameters that cause the different computing devices to have different initial values for their respective distributed instances. For example, the first computing device 222 may receive a first set of machine learning model parameters based on a determination that the first computing device 222 is associated with a first device type. Similarly, the second computing device may receive a second set of parameter values based on a determination that the second computing device 223 is associated with a second device type. In some embodiments, the different device types may indicate computing resources available to a computing device. Alternatively, or in addition, a device type associated with a computing device may indicate a sensor or equipment, where the sensor or equipment may be connected to a computing device, integrated with the computing device, or otherwise in communication with the computing device. For example, a computing system associated with a device type "MRI 1" may receive MRI images from an MRI machine having a model number "MRI 1."

In some embodiments, the first computing device 222 may obtain a first set of labeled images 233 that is associated with a first label "L01," and the second computing device 223 may obtain a second set of labeled images 243 that is also associated with the first label "L01" and also with the second label "L02." In some embodiments, the first computing device 222 may perform training operations to update the first distributed instance 232 based on the first set of labeled images 233. Similarly, the second computing device 223 may perform training operations to update the second distributed instance 242 based on the second set of labeled images 243. Each of the training operations for each device may be performed independently, synchronously, asynchronously, etc.

In some embodiments, the first computing device 222 may then generate noise images or other noise data. In some embodiments, the noise images may be limited to a set of pixel value ranges. The set of pixel value ranges may include color value ranges (e.g., a range of red value in an RGB color scheme), pixel brightness ranges, etc. In some embodiments, a pixel value range may be associated with a set of labels, where a label may represent an anomaly, a type of object (e.g., a body part, a person, a vehicle, etc.), a type of image (e.g., an X-ray image, a CAT scan, an MRI image, a sensor model, a camera model, etc.), or other categories. For example, the first computing device 222 may generate a first noise image 234 and a second noise image 235 based on a first set of noise distribution values, where the first and second noise images may be derived from pixel values of the first set of noise distribution values based on the first set of labeled images 233. Similarly, the second computing device 223 may generate a third noise image 244 and a fourth noise image 245 based on a second set of noise distribution values, where the third and fourth noise images may be derived from pixel values of the second set of noise distribution values based on the first set of labeled images 243. Furthermore, a client computing device may be used to generate noise data in some embodiments, and a server, cloud computing system, or other set of computing devices may be used to generate noise data in other embodiments.

In some embodiments, the first computing device 222 may provide noise images 234-235 to the first distributed instance 232 to determine a first set of outputs 236. Similarly, the second computing device 223 may provide noise images 244-245 to the second distributed instance 242 to determine a second set of outputs 246. As described elsewhere, a set of outputs of a distributed instance of a machine learning model may include a label, an image region associated with the label, a position associated with the label, a confidence value, a reconstructed image, etc. After determining outputs based on noise, a client computing device may send the set of outputs to a computing system for training a federated machine learning model. For example, the first computing device 222 may send versions of the noise images 234-235 and labels of the corresponding first set of outputs 236 to the cloud system 210. Similarly, the second computing device 223 may send versions of the noise images 244-245 and labels of the corresponding second set of outputs 246 to the cloud system 210. The cloud system 210 may use the versions of the noise images 234-235 and the noise images 244-245 as part of the inputs 204 to train the machine learning model 202 during a server-side learning operation.

In some embodiments, the cloud system 210 may use an objective function that is configured to have a lesser value when a predicted output of the set of outputs 206 matches an output associated with an input noise image. The value of an objective function ("objective function value") may characterize whether a model output of a machine learning model matches a target output during a training operation, where a greater mismatch may cause greater changes in parameters of the machine learning model. The cloud system 210 may be configured to reduce the objective function value when training the machine learning model 202. For example, the cloud system 210 may provide the first noise image 234 to the machine learning model 202 and update parameters of the machine learning model 202 based on a difference between an output of the set of outputs 206 and an associated output of the set of outputs 236, where the associated output was determined by providing the first distributed instance 232 with the first noise image 234.

Furthermore, in some embodiments, the cloud system 210 may update model parameters of the machine learning model 202 based on sets of machine learning parameters sent by client computing devices. For example, the first computing device 222 may send updated parameters of the first distributed instance 232 to the cloud system 210, and the second computing device 223 may send updated parameters of the second distributed instance 242 to the cloud system 210. The cloud system 210 may then determine a measure of central tendency based on the updated parameters and then update the machine learning model 202 based on the measure of central tendency.

In some embodiments, the cloud system 210 may first update model parameters of the machine learning model 202 directly based on updated weights or other updated machine learning models sent by the first computing device 222 or the second computing device 223. The cloud system 210 may then update model parameters of the machine learning model 202 based on noise data, where the noise data may include the noise images 234-235 and the noise images 244-245. Alternatively, some embodiments may update model parameters of the machine learning model 202 based on noise data without receiving updated model parameters of the first distributed instance 232 or the second distributed instance 242. Furthermore, in some embodiments, a computing system may send noise data to a client computing device, where the client computing device may provide the sent noise data to a machine learning model to determine a set of outputs. For example, the cloud system 210 may send a set of noise images to the first computing device 222 to determine a set of client-determined outputs. The first computing device 222 may then send the set of client-determined outputs to the cloud system 210, and the cloud system 210 may use the set of client-determined outputs to update a machine learning model.

FIG. 3 shows a flowchart for distributing a learning model and training a federated machine learning model based on training results provided by client computing devices, in accordance with one or more embodiments. Some embodiments may send a set of distributed instances of a machine learning model to a set of client computing devices, as indicated by block 304. Distributing an instance of a machine learning model may include sending parameters of the machine learning model to a client computing device. Alternatively, or additionally, distributing the instance may include distributing values, arrays of data, or other types of information that indicate an architecture of a machine learning model, hyper parameters, values identifying one or more features, etc. As described elsewhere, after receiving a distributed instance of a machine learning model, some embodiments may train the distributed instance of the machine learning model based on training data (e.g., labeled images and their associated labels).

Some embodiments may distribute different versions of a machine learning model to different client computing devices. For example, some embodiments may send a first set of weights to a first set of client computing devices and send a second set of weights to a second set of client computing devices, where the first and second sets have different values. In some embodiments, the different sets of values sent to different sets of client computing devices may indicate respective different architectures for learning models. By sending different sets of weights, some embodiments may test different combinations of weights or test different architectures of different learning models with respect to their usefulness for accurately predicting a result.

Some embodiments may send noise data or program instructions to the set of client computing devices that cause the set of client computing devices to provide noise data to their respective distributed instances to predict a set of outputs, as indicated by block 310. Some embodiments may generate noise data that is then used for machine learning training operations. For example, some embodiments may send a set of noise data to a client computing device, where the client computing device may then use the set of noise data to determine a predicted set of outputs. The noise data may include black and white noise images, greyscale noise images, color noise images, text, numeric values, etc. For example, some embodiments may generate a noise image by randomly selecting a color value for a pixel, where the color value may represent the value of a red value, green value, or blue value and using the selected color value when determining a pixel of a noise image.

Furthermore, some embodiments may store a noise distribution value or another type of data generation value in a database record of a database, where the database record may be identified or retrieved based on a device type or another type of device identifier. Some embodiments may generate noise images or other noise data based on a stored data generation value. For example, some embodiments may obtain instructions to generate noise data for a device identified as "MRI 01" and, in response, retrieve a database record by providing the device identifier "MRI 01." Some embodiments may then use a data generation value stored in the database record to determine a set of noise images for use during a server-side training operation, a testing operation, another type of operation, etc.

In some embodiments, a server or other set of computing devices may send a set of program instructions to a client computing device that causes the client computing device to use a learning model to generate predicted outputs based on noise data. The program instructions may be written in a scripting language or program language, such as Python, JavaScript, a proprietary programming or scripting language, a message that is compatible with an application program interface (API), etc. For example, some embodiments may send a message to a client computing device that is received by an API of an application executing on the client computing device. In response to receiving the message, the client computing device may send values.

Some embodiments may send program instructions to a client computing device without sending noise data. For example, a client computing device may generate its own noise data without receiving additional noise data from a server and use a distributed instance of a machine learning model to determine a predicted set of outputs based on the client computing device. Alternatively, some embodiments may send noise data to a client computing device without sending program instructions to the client computing device. For example, an application on a client computing device may be configured to perform prediction operations based on received noise data without requiring the receipt of any program instructions or other type of message from a server. Furthermore, as described elsewhere, a client computing device may be configured to generate noise data, provide the noise data to a distributed instance of a machine learning model to obtain a predicted set of outputs, and then provide the predicted set of outputs to a server for federated learning operations to update a server-accessible machine learning model.

Some embodiments may obtain a set of noise distribution values, where a noise distribution value may include a parameter used to generate noise data. For example, a noise distribution value may indicate a maximum or minimum change to a brightness value or color value for a pixel or set of pixels. The noise distribution value may be another type of parameter representing a distribution used to generate noise data. For example, the noise distribution value may be equal to five, where the noise distribution value may indicate that the maximum change to a red value of a portion of an image may increase or decrease by five. Furthermore, different noise distribution values may be used to generate a noise image, where a first portion of a noise image may be generated using a first noise distribution value and a second portion of a noise image may be generated using a second noise distribution value.

Some embodiments may obtain a set of noise distribution values based on a client computing device identifier, and then send the set of noise distribution values to the client computing device corresponding with the client computing device identifier. For example, some embodiments may determine that a machine learning model instance was sent to a first client computing device. Some embodiments may determine that the first client computing device had a set of noise distribution values corresponding with a maximum change equal to 10, a minimum change equal to three, and a set of probability distribution parameters. In some embodiments, the set of probability distribution parameters may represent a standard deviation or another distribution function parameter to characterize a probability distribution used to model changes in an image obtained by the first client computing device. Alternatively, or in addition, some embodiments may cause a client computing device to determine noise data without sending the client computing device any noise distribution values.

Some embodiments may obtain a predicted set of outputs from the set of client computing devices, as indicated by block 312. As described elsewhere in this disclosure, a client computing device may be caused to provide noise data to an updated machine learning model. In some embodiments, the set of outputs of the machine learning model may be sent to a server or another computing systems in association with a set of noise images. For example, a set of outputs predicted by a machine learning model may include an indicator of an image position or an image region, and some embodiments may receive the indicator of the image position or image region that may be used to determine a set of objective function values.

In some embodiments, receiving parameters of a machine learning model may be sufficient to cause an application executing on a client computing device to determine a set of noise values to determine accurate parameters. Alternatively, some embodiments may send explicit instructions to a client computing device to begin training operations. For example, some embodiments may determine that a machine learning model instance was sent to a first client computing device and, at a later time, send an instruction "start training" to the first client computing device to cause the first client computing device to train the distributed instance. Furthermore, as stated elsewhere in this disclosure, a client computing device may initiate learning model training based on other triggers not caused by messages, instructions, or other data received from a server, distributed computing system, or other computing system.

Some embodiments may send a set of expected parameter values to a client computing device. For example, some embodiments may send an initial range for a noise distribution value to a client device. The client computing device may then perform operations to send an alert value from the client computing device based on a determination that a measured value is too different or otherwise does not satisfy a set of criteria based on one or more values of the expected parameter value. For example, some embodiments may cause the client computing device to compare an expected range of a pixel brightness value for an image with an actual range of pixel brightness for the image. In response to a determination that an actual maximum or minimum is greater than an expected maximum or minimum by a threshold amount based on a comparison performed by a client computing device, the client computing device may send an alert value to a server or other computing system used to update a federated learning model.

Some embodiments may receive more noise images from one or more client computing devices than necessary for training operations and, in response, combine the noise images to form a representative set of training data. For example, some embodiments may determine a representative set of noise images by determining a maximum pixel value corresponding with a first noise image of a set of noise images. A maximum pixel value may include a maximum pixel color value, a maximum pixel brightness, a maximum average pixel brightness in a window (e.g., a maximum pixel brightness in a 2×2 pixel region, a 3×3 pixel region, a 5×5 pixel region, or some other-sized pixel region). Similarly, some embodiments may determine a minimum pixel value corresponding with a second noise image of the noise images. A minimum pixel value may include a minimum pixel color value, a minimum pixel brightness, a minimum average pixel brightness in a window (e.g., a maximum pixel brightness in a 2×2 pixel region, a 3×3 pixel region, a 5×5 pixel region, or some other-sized pixel region), etc. For example, some embodiments may select images for a representative set of noise images, where the representative set of noise images includes a first noise image corresponding with a first maximum pixel value, a second noise image corresponding with a second maximum pixel value, a third noise image corresponding with a first minimum pixel value, and a second noise image corresponding with a second minimum pixel value. Some embodiments may then train the server instance by using the representative set of noise images as server-side training inputs.

As described elsewhere in this disclosure, noise data may be generated by client devices, servers, or other computing devices. For example, a client computing device may obtain a set of noise distribution values from a client device memory or a server. The client computing device may then generate noise images or other noise data. For example, the client computing device may be caused to add or subtract values from the brightness of an image consisting of pixel clusters. In some embodiments, the values used to modify pixels of an image may be randomly selected from a range defined by a first noise distribution value acting as a minimum value and a second noise distribution value.

Some embodiments may apply one or more transform functions to an image to modify the pixels of an image such that the transformation may be based on a detected pixel pattern. For example, some embodiments may apply a blurring operation (e.g., gaussian blur) to pixel region(s) of a noise image, where parameters of the blurring operation may be obtained from analysis of an image region correlated with a label. Various types of transformations may occur. For example, in some embodiments, a computing device may use edge detection method to detect edges of an image region associated with a label and determine an average pixel value (e.g., an average red, green, or blue color value, an average brightness, etc.) and a detected change in brightness from a center of the region to an edge of the region. Some embodiments may then generate a pixel value function based on the detected change in brightness and generate a shape in a noise image that is then provided to a distribute instance of a machine learning model to determine a set of outputs.

As described elsewhere in this disclosure, some embodiments may receive compressed forms of training data. Receiving compressed data may include receiving a compressed image that was compressed with a lossless compression algorithm. For example, some embodiments may receive compressed images that have been compressed with run-length encoding, entropy encoding, a chain code algorithm, etc. Alternatively, some embodiments may receive a compressed image that was compressed with a lossy algorithm. For example, some embodiments may receive a compressed image that was compressed with a transform coding algorithm, a colored quantization algorithm, a chrome or sub-sampling algorithm, etc. In some embodiments, a client computing device may send a set of compressed data including compressed images to a server or other set of computing systems used to update a machine learning model. Some embodiments may then use the server or other set of computing systems to decompress the set of compressed data. For example, some embodiments may decompress a set of compressed data provided by a client computing device using a transform decoding algorithm to obtain a set of uncompressed noise images and their corresponding set of labels. Some embodiments may then train a machine learning model using the uncompressed noise images and the corresponding set of labels.

Some embodiments may include instructions to update the same or different models or sub-models based on whether a set of client computing devices share a device type. Furthermore, by updating different sub-models, some embodiments may increase the accuracy of learning models that rely on multiple other learning models (e.g., an ensemble learning model). Some embodiments may determine whether a first set of devices and a second set of devices are associated with a shared device type in order to determine whether data associated with the devices may be used to train the same model. For example, if the first set of devices is associated with "MRI 01" and a second set of devices is also associated with "MRI 01," some embodiments may determine that the first and second set of devices share a device type. In response, some embodiments may then determine use both a first set of outputs provided by a first set of devices and a second set of outputs by provided a second set of devices to train a machine learning model.

Alternatively, some embodiments may determine that a first set of devices and a second set of devices are associated with different device types. In response, some embodiments may use outputs provided by the first set of devices and their associated noise images to train a first server-accessible instance of a machine learning model. Some embodiments may then use outputs provided by the second set of devices and their associated noise images to train a second server-accessible instance of a machine-learning model. For example, some embodiments may determine that a first computing device is associated with the device type "CAT SCAN" and that a second computing device is associated with the device type "X-RAY." In response, some embodiments may train a first machine learning model by using the outputs provided by the first computing device and train a second machine learning model by using the outputs provided by the second computing device.

Some embodiments may determine that generated noise data received from one or more devices are significantly different from an expected range. For example, some embodiments may determine that a computing device has provided a set of noise images that differ significantly in pixel value from an expected range of pixel values, were the expected range of pixel values may be determined based on a device type associated with the computing device. In response to a determination that the devices are of a same type and that the generated noise data significantly differ, some embodiments may indicate that one or more computing devices is providing anomalous noise data.

As described elsewhere, a client computing device may use a noise distribution value or another type of data generation value to generate a set of noise images or other training data. In some embodiments, the client computing device may directly send the data generation value to a server, where some embodiments may detect an anomaly based on the noise distribution value or other type of data generation value provided by a client computing device. Some embodiments may receive a first data generation value from a first computing device and a plurality of data generation values from a plurality of other computing devices. Some embodiments may then determine an aggregated data generation value or a data generation range based on the plurality of data generation values, where the aggregated data generation value may be a measure of central tendency determined based on the plurality of data generation values. Some embodiments may then determine whether the first data generation value differs from the aggregated data generation value or data generation range by more than an outlier threshold and, in response to a determination that the first data generation value differs from the aggregated data generation value by more than the outlier threshold, associate the first computing device with an anomaly label.

Some embodiments may train the server-accessible instance of the machine learning model based on the predicted set of outputs to update a set of machine learning model parameters, as indicated by block 318. As described elsewhere, some embodiments may use a set of client-generated training data to determine a representative set of training data and then use the representative set of training data as server-side training inputs for training a machine learning model stored on a server memory or another memory accessible to the server. Furthermore, while some embodiments may perform training operations using a centralized server, some embodiments may use a distributed computing system to perform training operations or other operations described in this disclosure.

As described elsewhere in this disclosure, some embodiments may train various types of learning models, such as a neural network model, a boosted, tree-based model, an elliptic envelope learning model, some combination of other learning models, etc. In some embodiments, a federated learning model may include multiple sub-models, where different sub-models may be assigned to different learning devices. For example, some embodiments may use a representative set of client-generated data that includes client-generated noise images and their associated predicted outputs to train a server-side learning model by using the representative set of client-generated data as client-generated noise images.

In some embodiments, a server or other computing device may re-distribute parameters of a machine learning model after updating the machine learning model based on noise data and outputs provided by client computing devices. For example, some embodiments may retrain a server-accessible instance of a machine learning model based on a predicted set of outputs provided by a client computing device. After updating the server-accessible instance by performing the retraining operation, some embodiments may re-distribute the server-accessible instance by sending parameters of the machine learning model (e.g., modified weights of the machine learning model) to the client computing device.

Some embodiments may generate outputs that include a reconstruction of an image. For example, some embodiments may obtain a first portion of an image and provide the first portion of the image to a machine learning model. The machine learning model may produce a set of outputs based on the input. Some embodiments may then generate a new image based on the set of outputs. For example, some embodiments may obtain a noise image having a first 5×5 pixel region and obtain a second 5×5 pixel region representing a reconstructed image generated by a distributed instance of a machine learning model stored on a client computing device. Some embodiments may then train a server-accessible instance of the machine learning model based on the second 5×5 pixel region, where an objective function value based on a difference between the output of the server-accessible instance and the reconstructed image may cause changes to model parameters of the server-accessible instance of the machine learning model.

Some embodiments may determine that generated noise data received from two devices are significantly different from each other despite being associated with a same device type. In response to a determination that the devices are of a same type and that the generated noise data significantly differ, some embodiments may indicate that one or more of the devices display anomalous activity. For example, some embodiments may determine a plurality of data generation values, such as a plurality of integer arrays representing ranges of a pixel color value associated with labels associated with the plurality of integer arrays. Some embodiments may then determine an alert threshold based on the plurality of data generation values, where the alert threshold may include a median value of the range of values, mean average of the range of values, a maximum value, a minimum value, a standard deviation, etc. Some embodiments may then determine that a data generation value obtained from a candidate computing device satisfies the alert threshold and, in response, associate the candidate computing device with an anomaly label indicating that data from the candidate computing device may be anomalous. Furthermore, some embodiments may perform a check to determine whether the candidate computing device shares a device type with the plurality of computing devices used to provide the noise data or other data used to determine alert threshold before permitting a candidate computing device to be labeled as anomalous. For example, if a plurality of computing devices is associated with the device type "CAT-01" and provides images used to generate an alert threshold, some embodiments may determine whether the candidate computing device is also associated with the device type "CAT-01" before permitting the candidate computing device to be labeled as anomalous.

Figure 4:
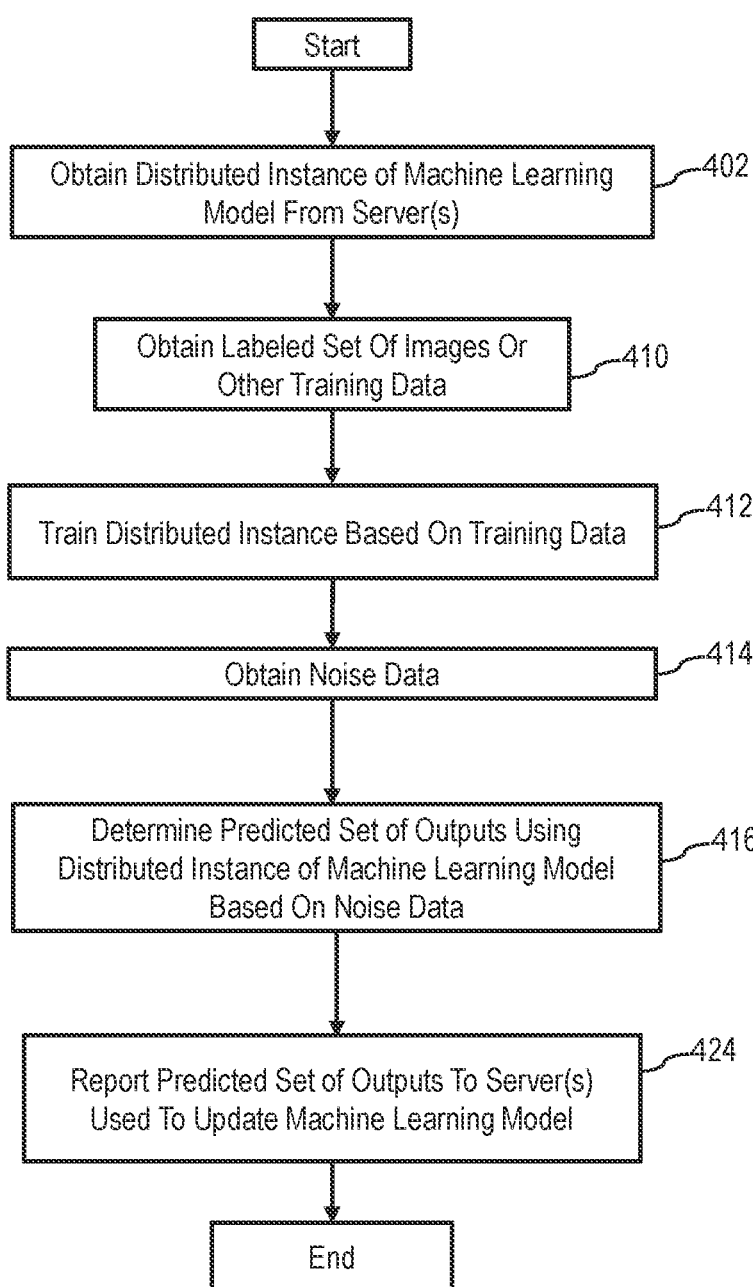
FIG. 4 shows a flowchart for receiving an instance of a learning model and training the distributed instance based on a set of generated noise data, in accordance with one or more embodiments.

FIG. 4 shows a flowchart for receiving an instance of a learning model and training the distributed instance based on a set of generated noise data, in accordance with one or more embodiments. Some embodiments may obtain a distributed instance of a machine learning model from a server, as indicated by block 402. As described elsewhere in this disclosure, a server or other set of computing systems may send a distributed instance to a client computing device by sending machine learning model parameters to the client computing device. Some embodiments executing on the client computing device may receive the distributed instance for a first time. Alternatively, some embodiments may receive a new version of a distributed instance and update existing values of a previously received distributed instance based on the new version of the distributed instance.

Some embodiments may obtain a labeled set of images or other training data, as indicated by block 410. In some embodiments, a client computing device may obtain the labeled set of images from a memory of the client computing device. For example, a client computing device may obtain a first image that is labeled with a label "tumor" and is associated with a set of values representing a region in the first image associated with the label. Alternatively, or in addition, some embodiments may receive one or more images of a labeled set of images from a server or another data source. Various other types of data may be used as training data. For example, a user or decision system may provide labels for an image or a region of an image, determine quantities associated with an image or region of the image, determine the shape of a detected object in the image, determine a confidence value or confidence interval for a prediction, etc. For example, a client computing device may obtain user-provided boundaries of image regions in an image associated with the label "anomaly" and a confidence value "0.96."

Some embodiments may train the distributed instance based on the training data, as indicated by block 412 After obtaining training data, some embodiments may train the distributed instance using received or generated training data. For example, a client computing device may use user-provided boundaries as training data to update weights of a convolutional neural network pre-trained to detect abnormal growths based on MRI images, where the boundaries may represent the boundaries of an abnormal growth.

A machine learning model may be used to generate various types of predicted outputs, such as labels, confidence intervals, regions, reconstructed images, etc. For example, a first image may be labeled with the label value "bird," where the label "bird" may be associated with a box represented by the coordinates "[[0,0],[100,100]]" of the first image. Some embodiments may then update a distributed instance by training the distributed instance to select the label "bird," select a region represented by the coordinates "[[0,0],[100, 100]]," and provide a confidence interval for the predicted label and predicted image region when provided with the first image. After updating a distributed instance of a machine learning model by training the distributed instance, some embodiments may then use the updated distributed instance to perform prediction operations described in this disclosure, such as operations described by block 416.

Some embodiments may obtain noise data, as indicated by block 414. Obtaining noise data may include generating noise data or obtaining noise data. In some embodiments, a client computing device may generate noise images by performing one or more transformations on some or all pixels of an image of a labeled set of images. The transformation may include blurring an image region, changing the contrast of the image region, changing one or more color values of pixels in the image region, changing one or more brightness values of pixels in the image region, etc.

Some embodiments may randomly generate noise data. In some embodiments, a random noise generator may be used to generate the randomly generated noise data. In some embodiments, the randomly generated noise data may be pre-generated and stored in a database. In this scenario, obtaining the noise data may including accessing the database and retrieve the randomly generated noise data. The randomly generated noise data may include an audible representation of noise (e.g., random collection of audible frequencies) and/or a visual representation of noise (e.g., random array of colors and intensities). Furthermore, in some embodiments, the randomly generated noise data may include a collection of audible noise or noise images. In some embodiments, such randomization may be a pseudo-randomization (e.g., by executing one or more RdRand instructions and applying one or more seed values or via other randomization techniques to randomly generate the noise data).

Some embodiments may determine a noise distribution value or another type of data generation value based on one or more images of the labeled set of images, where the noise, distribution value or other type of data generation value may be used to generate noise images. For example, some embodiments may determine a noise distribution image representing a range of color intensities or brightness based on pixel color values, or pixel brightness values of a labeled set of images. Some embodiments may then randomly or pseudo-randomly determine a set of pixel values in an image region of a first image of the labeled set of images. Furthermore, some embodiments may use data generation values that are not noise distribution values, such as values used to generate text, numeric values, or other types of values. In some embodiments, text, numeric values, or other types of values may be used that may be used as other types of inputs for a machine learning model.

Some embodiments may determine a data generation value based on portions of different images. For example, some embodiments may determine a first set of pixel values of a first set of pixels of a first image region of a first image and a second set of pixel values of a second set of pixels of a second image region of a second image. In some embodiments, the first and second image regions may have the same size (e.g., have the same count of pixels). For example, some embodiments may determine a range of red values for a set of pixel blocks that includes a 5×5 block of pixels in a labeled region of a first image and a 5×5 block of pixels in a labeled region of a second image. Some embodiments may then use the range of red values to modify pixel values in 5×5 block of pixels based on the range, such as by selecting a random value in the range to shift a red value of a pixel of a third image.

Some embodiments may determine a predicted set of outputs using the distributed instance of the machine learning model based on the noise data, as indicated by block 416. As described elsewhere in this disclosure, a client computing device may perform prediction operations based on noise data, where the noise data may be generated by a client computing device or provided to the client computing device. For example, a client computing device may provide noise data that includes ten noise images to a distributed instance, where the distributed instance may have been previously trained by using secured data stored in a memory of the client computing device. Alternatively, a client computing device may use a distributed instance that is unchanged from the version of the distributed instance that was provided to the client computing device when determining a predicted set of outputs. As described elsewhere, the predicted set of outputs based on the noise data may include classification labels, regions, confidence intervals, reconstructed images, etc.

Some embodiments may report the predicted set of outputs to a set of servers used to update a machine learning model, as indicated by block 424. Some embodiments may report, to a server, machine learning model outputs such as labels, image regions, confidence intervals, or reconstructed images, etc. For example, some embodiments may provide a set of noise data to a distributed instance to obtain a predicted set of outputs that includes a set of arrays representing boundaries associated with anomalies for a set of noise images. Some embodiments may then send the set of arrays to a server, where the server may perform one or more operations described in this disclosure, such as operations described by block 312 or 318. Furthermore, in some embodiments, a client computing device may send machine learning model parameters of a distributed instance, labels associated with client-generated training data, or other values to a server or another set of computing systems. In some embodiments, data provided by a client computing system may be used to perform one or more operations described in this disclosure, such as operations described by block 312 or block 318.

Some embodiments may determine what data to send to a server or other computing system based on the magnitude of a set of differences between model parameters for a machine learning model before and after a set of training operations. For example, some embodiments may first generate a set of noise images based on a labeled set of images. Some embodiments may then perform a set of training operations based on the generated set of noise images and its associated labels. Some embodiments may determine a first comparison value for a set of machine learning model parameters (e.g., neural network weights, random forest parameter values, etc.) before the set of training operations, where the comparison value may be a measure of central tendency, a maximum value, a minimum value, etc. Some embodiments may also determine a second comparison value for the set of machine learning model parameters after the set of training operations. Some embodiments may determine whether a difference or value correlated with the difference between the first and second comparison values satisfies a threshold. In response to a determination that the difference does not satisfy the threshold, some embodiments may send client-generated noise images and their associated labels such that the noise images and associated labels may be used to train a server-accessible machine learning model. Alternatively, response to a determination that the difference does satisfy the threshold, some embodiments may send client-trained machine learning model parameters to update a server-accessible machine learning model.

The operations of each method presented in this disclosure are intended to be illustrative and non-limiting. It is contemplated that the operations or descriptions of FIG. 3 or FIG. 4 may be used with any other embodiment of this disclosure. In addition, the operations and descriptions described in relation to FIG. 3 or FIG. 4 may be done in alternative orders or in parallel to further the purposes of this disclosure. For example, each of these operations may be performed in any order, in parallel, or simultaneously to reduce lag or increase the speed of a computer system or method. In some embodiments, the methods may be accomplished with one or more additional operations not described, and/or without one or more of the operations discussed. Additionally, the order in which the processing operations of the methods are illustrated (and described below) is not intended to be limiting.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a non-transitory, machine-readable medium, such as an electronic storage medium. Furthermore, the use of the term "media" may include a single medium or combination of multiple media, such as a first medium and a second medium. The processing devices may include one or more devices configured through hardware, firmware, and/or software to be specifically designed for execution of one or more of the operations of the methods. For example, it should be noted that any of the devices or equipment discussed in relation to FIGS. 1-2 could be used to perform one or more of the operations in FIG. 3 or FIG. 4.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 may include one or more computing devices that are programmed to perform the functions described herein. The computing devices may include one or more electronic storages (e.g., the set of databases 130), one or more physical processors programmed with one or more computer program instructions, and/or other components. For example, the set of databases may include a relational database such as a PostgreSQL™ database or MySQL database. Alternatively, or additionally, the set of databases 130 or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., network 150) or other computing platforms via wired or wireless techniques. The network may include the Internet, a mobile phone network, a mobile voice or data network (e.g., a 5G or Long-Term Evolution (LTE) network), a cable network, a public switched telephone network, or other types of communications networks or combinations of communications networks. The network 150 may include one or more communications paths, such as Ethernet, a satellite path, a fiber-optic path, a cable path, a path that supports Internet communications (e.g., IPTV), free-space connections (e.g., for broadcast or other wireless signals), WiFi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 124-126 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 124-126 described herein is for illustrative purposes, and is not intended to be limiting, as any of subsystems 124-126 may provide more or less functionality than is described. For example, one or more of subsystems 124-126 may be eliminated, and some or all of its functionality may be provided by other ones of subsystems 124-126. As another example, additional subsystems may be programmed to perform some or all of the functionality attributed herein to one of subsystems 124-126.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as user input interfaces. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompasses both all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X'ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing time. Thus, updating a record may include generating a record or modifying the value of already-generated value.

The present techniques will be better understood with reference to the following enumerated embodiments:

1. A method comprising: sending, from a first set of computing devices, a distributed instance of a machine learning model to a client computing device; receiving, from the client computing device, a set of prediction outputs related to noise data inputted into the distributed instance at the client computing device; and training an instance of the machine learning model by using the noise data and the set of prediction outputs as training inputs for the instance.

2. A method comprising: the client computing device trains the distributed instance to determine an updated instance based on a set of labeled images; the client computing device provides the updated instance with a set of noise images to predict a set of prediction outputs; obtaining, from the client computing device, the set of prediction outputs; and training a server-accessible instance of the machine learning model by using the set of noise images as server-side training inputs and by determining a set of objective function values based on the set of prediction outputs.

3. A method comprising: sending a distributed model instance of a federated machine learning model to a client computing device; sending noise images to the client computing device, wherein: the client computing device obtains an updated model instance of the distributed model instance by training the distributed model instance based on labeled images accessible to the client computing device; and the client computing device inputs the noise images into the updated model instance to obtain a set of prediction outputs related to the noise images from the updated model instance; obtaining, from the client computing device, the set of prediction outputs; and training a server model instance of the federated machine learning model by using the noise images as server-side training inputs and by determining a set of objective function values based on the set of prediction outputs.

4. The method of any of embodiments 1 to 3, the method further comprising: determining a set of noise distribution values based on a device type associated with the client computing device; generating the noise images based on the set of noise distribution values; and sending the noise images to the client computing device.

5. The method of any of embodiments 1 to 4, wherein the client computing device is a first client computing device, and wherein the noise images are first noise images, and wherein the set of prediction outputs comprises a first plurality of labels predicted for the first noise images, the method further comprising: obtaining second noise images, wherein the second noise images are used by a second client computing device to predict a second plurality of labels for the second noise images; determining the server-side training inputs based on the first noise images and the second noise images; and determining a second set of objective function values based on the second plurality of labels.

6. The method of any of embodiments 1 to 5, wherein: the client computing device is a first client computing device; the first client computing device is associated with a first device type; a second client computing device is associated with a second device type; the federated machine learning model is a first machine learning model; the noise images are first noise images; the set of prediction outputs is a first set of outputs; the method further comprises: obtaining second noise images and a second set of outputs from the second client computing device; determining whether the first client computing device and the second client computing device are associated with different device types; in response to a determination that the first client computing device and the second client computing device are associated with different device types, training a server instance of a second machine learning model based on the second noise images and the second set of outputs.

7. The method of any of embodiments 1 to 6, wherein the client computing device generates the set of noise images, the method further comprising receiving the set of noise images from the client computing device.

8. The method of any of embodiments 1 to 7, further comprising: generating the set of noise images based on a data generation value; and sending the set of noise images to the client computing device.

9. The method of any of embodiments 1 to 8, wherein generating the set of noise images comprises: randomly selecting a color value for a pixel, wherein the color value is a red, green, or blue color value; and determining a noise image of the set of noise images based on the color value.

10. The method of any of embodiments 1 to 9, wherein the client computing device is a first computing device, and wherein the data generation value is a first data generation value, further comprising: receiving the first data generation value from the first computing device; receiving a plurality of data generation values from a plurality of other computing devices; determining an alert threshold based on the plurality of data generation values; determining whether the first data generation value satisfies the alert threshold; and in response to a determination that the first data generation value satisfies the alert threshold, associating the first computing device with an anomaly label.

11. The method of any of embodiments 1 to 10, wherein: the machine learning model comprises a first model associated with a first set of weights and a second model associated with a second set of weights; the distributed instance is a first distributed instance; and the method further comprising: sending a second distributed instance of the machine learning model to a second client computing device; obtaining a second set of prediction outputs from the second client computing device, wherein the second set of prediction outputs is determined an updated version of the second distributed instance; and training the second model based on the second set of prediction outputs.

12. The method of any of embodiments 1 to 11, wherein the set of noise images is a first set of noise images, further comprising: determining a device identifier associated with the client computing device; retrieving a data generation value from the client computing device; storing the data generation value in association with the device identifier in a database record; and generating a second set of noise images by accessing the database record.

13. The method of any of embodiments 1 to 12, further comprising: sending an expected parameter value to the client computing device, wherein the client computing device is caused to: determine an alert threshold based on the expected parameter value; determine that a data generation value satisfies the alert threshold; receiving an alert value from the client computing device, wherein the alert value indicates that the data generation value satisfies the alert threshold; and associating data provided by the client computing device with the alert value in a memory.

14. The method of any of embodiments 1 to 13, wherein the client computing device generates a set of noise data items that is inputted as the noise data to the distributed instance, the method further comprising receiving the set of noise data items from the client computing device.

15. The method of any of embodiments 1 to 14, further comprising: generating, based on a data generation value, a set of noise data items that is inputted as the noise data to the distributed instance; and sending the set of noise data items to the client computing device.

16. The method of any of embodiments 1 to 15, wherein generating the set of noise data items comprises: randomly selecting a color value for a pixel; and determining a noise data item of the set of noise data items based on the color value.

17. The method of any of embodiments 1 to 16, the method further comprising sending, to the client computing device, a parameter of the instance of the machine learning model after updating the instance based on the set of prediction outputs, wherein the parameter causes the client computing device to update the distributed instance based on the parameter.

18. The method of any of embodiments 1 to 17, the method further comprising: receiving a set of machine learning parameters of the distributed instance from the client computing device after the client computing device trains the distributed instance, wherein training the instance of the machine learning model comprises updating the instance of the machine learning model based on the set of machine learning parameters of the distributed instance, the noise data, and the set of prediction outputs.

19. The method of any of embodiments 1 to 18, the method further comprising: retrieving a labeled set of images comprising a first image and a second image, wherein the first image and the second image are associated with a label; determining a data generation value based on pixel values of the labeled set of images; and generating a noise image of the noise data based on the data generation value, wherein receiving the set of prediction outputs comprises obtaining, from the client computing device, a prediction output related to the noise image by sending the noise image to the client computing device, the prediction output being derived from the noise image being inputted into the distributed instance at the client computing device.

20. The method of any of embodiments 1 to 19, wherein the set of prediction outputs comprises an indication of an image position or image region boundary.

21. One or more tangible, non-transitory, machine-readable media storing instructions that, when executed by one or more processors, effectuation operations comprising those of any of embodiments 1-20.

22. A system comprising: one or more processors; and memory storing computer program instructions that, when executed by the one or more processors, cause the one or more processors to effectuate operations comprising those of any of embodiments 1-20.

What is claimed is:

1. A server system for training a federated machine learning model based on received prediction outputs provided by client computing devices, the system comprising:

one or more processors and one or more non-transitory media storing program instructions that, when executed by the one or more processors, causes the one or more processors to perform operations comprising:

sending a distributed model instance of a federated machine learning model to a client computing device, wherein an updated model instance of the distributed model instance on the client computing device is derived from the client computing device training the distributed model instance with labeled images accessible to the client computing device;

sending noise images to the client computing device, wherein a set of prediction outputs related to the noise images is derived from the client computing device executing the updated model instance on the noise images; and in response to the set of prediction outputs being obtained from the client computing device, training a server model instance of the federated machine learning model by using the noise images as server-side training inputs and the set of prediction outputs as reference feedback, wherein a set of objective function values is included as part of the server model instance based on the training of the server model instance with the noise images and the set of prediction outputs.

2. The server system of claim 1, the operations further comprising:

storing, in a database, a set of noise distribution values derived from a device type associated with the client computing device, wherein sending the noise images to the client computing device comprises sending one or more noise images derived from the set of noise distribution values to the client computing device.

3. The server system of claim 1, wherein training the server model instance comprises:

in response to the set of prediction outputs being obtained from the client computing device and a plurality of labels derived from second noise images being obtained from a second client computing device, training the server model instance of the federated machine learning model by using the noise images and the second noise images as server-side training inputs and the set of prediction outputs and the plurality of labels as reference feedback, wherein a second set of objective function values is included as part of the server model instance based on the training of the server model instance with the second noise images and the plurality of labels derived from the second noise images.

4. The server system of claim 1, the operations further comprising:

in response to (i) a second set of prediction outputs being obtained from a second client computing device and (ii) a second device type associated with the second client computing device being different from a first device type associated with the first client computing device, training a second server model instance of a second machine learning model with second noise images and the second set of prediction outputs in lieu of training the server model instance of the federated machine learning model with the second noise images and the second set of prediction outputs.

5. A method comprising:

sending a distributed instance of a machine learning model to a client computing device;

receiving, from the client computing device, a set of prediction outputs related to noise data inputted into the distributed instance at the client computing device; and training a server-accessible instance of the machine learning model by using the noise data and the set of prediction outputs as server-side training inputs for the server-accessible instance.

6. The method of claim 5, further comprising:

receiving, as at least part of the noise data, noise image data from the client computing device, wherein training the server-accessible instance of the machine learning model comprises using the noise image data and the set of prediction outputs as server-side training inputs for the server-accessible instance.

7. The method of claim 5, further comprising:

sending, to the client computing device, as at least part of the noise data, noise image data derived from a data generation value.

8. The method of claim 7, wherein the noise image data is derived from a random color value for a pixel that comprises a red, green, or blue color value.

9. The method of claim 7, wherein, before the noise data is inputted into the distributed instance at the client computing device, the distributed instance is trained at the client computing device using a set of labeled images that are not used as server-side training inputs for the training of the server-accessible instance.

10. The method of claim 5, wherein:

the machine learning model comprises a first model associated with a first set of weights and a second model associated with a second set of weights;

the distributed instance is a first distributed instance; and the method further comprising:

sending a second distributed instance of the machine learning model to a second client computing device;

receiving, from the second client computing device, a second set of prediction outputs outputted by an updated version of the second distributed instance; and training the second model based on the second set of prediction outputs.

11. The method of claim 5, further comprising:

sending, the client computing device, as at least part of the noise data, noise image data derived from a device identifier associated with the client computing device.

12. The method of claim 5, wherein training the server-accessible instance of the machine learning model comprises training the server-accessible instance of the machine learning model using randomly-generated noise data and the set of prediction outputs as server-side training inputs for the server-accessible instance.

13. One or more non-transitory, machine-readable media storing program instructions that, when executed by one or more processors, causes the one or more processors to perform operations comprising:

sending, from a first set of computing devices, a distributed instance of a machine learning model to a client computing device;

receiving, from the client computing device, a set of prediction outputs related to noise data inputted into the distributed instance at the client computing device; and training an instance of the machine learning model by using the noise data and the set of prediction outputs as training inputs for the instance.

14. The one or more non-transitory, machine-readable media of claim 13, wherein the client computing device generates a set of noise data items that is inputted as the noise data to the distributed instance, the operations further comprising receiving the set of noise data items from the client computing device.

15. The one or more non-transitory, machine-readable media of claim 13, further comprising:

sending, to the client computing device, a set of noise data items derived from a data generation value, wherein receiving the set of prediction outputs comprises receiving, from the client computing device, the set of prediction outputs related to the set of noise data items inputted into the distributed instance at the client computing device.

16. The one or more non-transitory, machine-readable media of claim 15, wherein the noise data is derived from a random color value for a pixel that comprises a red, green, or blue color value.

17. The one or more non-transitory, machine-readable media of claim 13, the operations further comprising sending, to the client computing device, a parameter of the instance of the machine learning model after updating the instance based on the set of prediction outputs, wherein the parameter causes the client computing device to update the distributed instance based on the parameter.

18. The one or more non-transitory, machine-readable media of claim 13, the operations further comprising:

receiving a set of machine learning parameters of the distributed instance from the client computing device after the client computing device trains the distributed instance, wherein training the instance of the machine learning model comprises updating the instance of the machine learning model based on the set of machine learning parameters of the distributed instance, the noise data, and the set of prediction outputs.

19. The one or more non-transitory, machine-readable media of claim 13, the operations further comprising:

retrieving a labeled set of images comprising a first image and a second image, wherein the first image and the second image are associated with a label;

determining a data generation value based on pixel values of the labeled set of images; and generating a noise image of the noise data based on the data generation value, wherein receiving the set of prediction outputs comprises obtaining, from the client computing device, a prediction output related to the noise image by sending the noise image to the client computing device, the prediction output being derived from the noise image being inputted into the distributed instance at the client computing device.

20. The one or more non-transitory, machine-readable media of claim 13, wherein the set of prediction outputs comprises an indication of an image position or image region boundary.

\* \* \* \* \*